(12) United States Patent
Caliendo et al.

(10) Patent No.: US 8,587,170 B2
(45) Date of Patent: Nov. 19, 2013

(54) ACTUATOR ARRANGEMENT WITH WORM GEAR AND ROTATIONAL OUTPUT HAVING AN ENCODER

(75) Inventors: Guy P. Caliendo, Algonquin, IL (US); Dean B. Anderson, Wonder Lake, FL (US); Pankaj V. Kalore, Buffalo Grove, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 749 days.

(21) Appl. No.: 12/470,303

(22) Filed: May 21, 2009

(65) Prior Publication Data

US 2009/0295258 A1 Dec. 3, 2009

Related U.S. Application Data

(60) Provisional application No. 61/054,848, filed on May 21, 2008.

(51) Int. Cl.
*H02K 49/00* (2006.01)
*H02K 7/06* (2006.01)
*H02K 7/10* (2006.01)

(52) U.S. Cl.
USPC .............................. 310/83; 310/99; 310/68 B

(58) Field of Classification Search
USPC ............................................ 310/68 B, 83, 99
IPC .......................... H02K 23/66,7/06, 7/10, 49/00
See application file for complete search history.

(56) References Cited

U.S. PATENT DOCUMENTS

| | | | | | |
|---|---|---|---|---|---|
| 4,573,723 | A | * | 3/1986 | Morita et al. | 292/336.3 |
| 5,307,013 | A | * | 4/1994 | Santos et al. | 324/207.2 |
| 5,839,320 | A | | 11/1998 | Komachi | |
| 5,986,369 | A | * | 11/1999 | Hanley et al. | 310/77 |
| 6,084,365 | A | * | 7/2000 | Anderson et al. | 318/362 |
| 6,465,915 | B1 | * | 10/2002 | Kerdjoudj et al. | 310/40 MM |
| 6,917,034 | B2 | * | 7/2005 | Iino et al. | 250/231.13 |
| 7,055,795 | B2 | | 6/2006 | Lay | |
| 7,213,482 | B2 | * | 5/2007 | Minasian et al. | 74/421 A |
| 7,464,620 | B2 | | 12/2008 | Li et al. | |
| 2004/0123733 | A1 | * | 7/2004 | Yamamoto | 92/136 |
| 2009/0179528 | A1 | * | 7/2009 | Omura et al. | 310/68 B |

* cited by examiner

*Primary Examiner* — Terrance Kenerly

(57) ABSTRACT

A first embodiment is an actuator arrangement having a rotational output and a motor. The actuator arrangement further includes at least one intermediate gear, an output gear, and an encoding detector. The motor has an output shaft that includes a worm gear. The output gear generates a rotational output at an axis thereof. Position encoding indicia are fixedly arranged on the output gear. The encoding detector is disposed in position to detect the position encoding indicia.

10 Claims, 4 Drawing Sheets

ACTUATOR ARRANGEMENT WITH WORM GEAR AND ROTATIONAL OUTPUT HAVING AN ENCODER

This application claims the benefit of U.S. Provisional Patent Application Ser. No. 61/054,848, filed May 21, 2008, which is incorporated herein by reference.

FIELD OF THE INVENTION

The present invention relates generally to actuators, and more specifically, to actuators having a rotational output.

BACKGROUND OF THE INVENTION

Actuators having a rotational output have use, for example, in heating, ventilation and air conditioning ("HVAC") systems. One common use in HVAC systems is in a ventilation damper system, sometimes known as a variable air valve (VAV) damper system. In a VAV system, a ventilation damper (or set of dampers) can be rotated to various positions to control the amount of air flowing into or out of a space or shaft. A common VAV system configuration allows for the dampers to be opened from 0 degrees (fully closed) to 90 degrees (fully open).

One example of the use of a VAV system is to control cooling of a room in a building by regulating the flow of chilled air into the room. Another application of a VAV system is to regulate the amount of fresh air and recycled air that is circulated through the building HVAC system.

A significant concern in the design, construction and use of HVAC is operational efficiency. Because HVAC systems employ substantial energy resources, efficient operation advantageously can reduce the costs of operating a building. While inefficiencies can be identified in many aspects of an HVAC system, at least some are associated with VAV systems. For example, if a VAV system does not predictably or accurately open to an expected or desired amount, the VAV system may pass more or less air than expected. Such an error can be attributable to poor position control of the damper by the actuator.

As a result of poor position control of the damper, further control may be required to obtain a desired output, such as room temperature or fresh air content. Such further control requires additional energy for additional movement of mechanical structures, while initial error can result in efficient use of chilled, heated or fresh air.

In general, such losses can often be tolerated, even if they are not optimal. However, there are cases in which such inefficiencies and/or errors in actuator operation are particularly undesirable. For example, an actuator that controls the position of the sash of a fume hood system requires additional accuracy. In particular, because the fume hood is handling ventilation of noxious gasses, the "sash" of a fume hood needs to be controllable closed, and indeed typically requires accurate and complete closure under certain modes of operation.

Under such modes, inaccurate closing can result in overshoot or undershoot. Overshoot occurs when the actuator attempts to close the sash beyond 100% closed, and can result in damage to the sash or mechanical linkage members, among other things. Undershoot occurs when the actuator does not fully close the sash, and can result in leakage or improper handling of noxious or dangerous vapors. Overshoot and undershoot can occur from poor positional feedback and/or from poor control.

One way to avoid overshoot and undershoot, at least in cases of poor control is to dampen the step function response of the control algorithm. While further dampening reduces the possibility of overshoot, it comes at the cost of slower response time.

There is a need, therefore, for improved actuator operation to improve control in HVAC applications, including but not limited to those relating to fume hoods.

SUMMARY

At least some embodiments of the present invention address the above needs, as well as others, by employing a worm gear in the gear train of the actuator. In some cases, this is combined with direct positional feedback to provide tight control over the position of the actuator output.

A first embodiment is an actuator arrangement having a rotational output and a motor. The actuator arrangement further includes at least one intermediate gear, an output gear, and an encoding detector. The motor has an output shaft that includes a worm gear. The output gear generates a rotational output at an axis thereof. Position encoding indicia are fixedly arranged on the output gear. The encoding detector is disposed in position to detect the position encoding indicia.

A second embodiment is an actuator arrangement having a rotational output and a motor. The actuator arrangement further includes at least one intermediate gear, an output gear, an encoding detector and a control circuit. The motor has an output shaft including a worm gear. The output gear generates a rotational output at an axis thereof, wherein position encoding indicia are fixedly arranged on the output gear. The encoding detector is disposed in position to detect the position encoding indicia. The control circuit has a position input, and a feedback input coupled to the encoding detector. The control circuit is configured to drive the motor based on a position signal received at the position input and a feedback signal received at the encoding detector.

The above described features and advantages, as well as others, will become more readily apparent to those of ordinary skill in the art by reference to the following detailed description and accompanying drawings.

DETAILED DESCRIPTION

Figure 1:
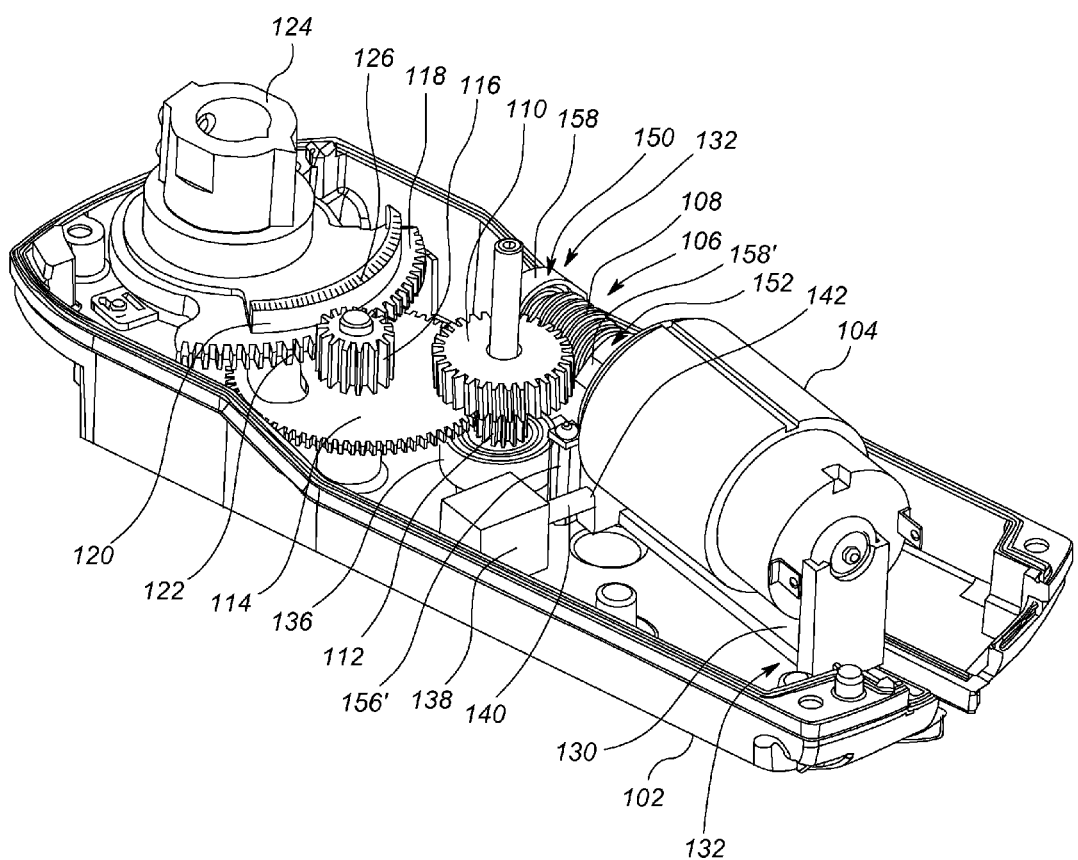
FIG. 1 shows a fragmentary plan view of an exemplary embodiment of an actuator in accordance with the present invention.
Figure 2:
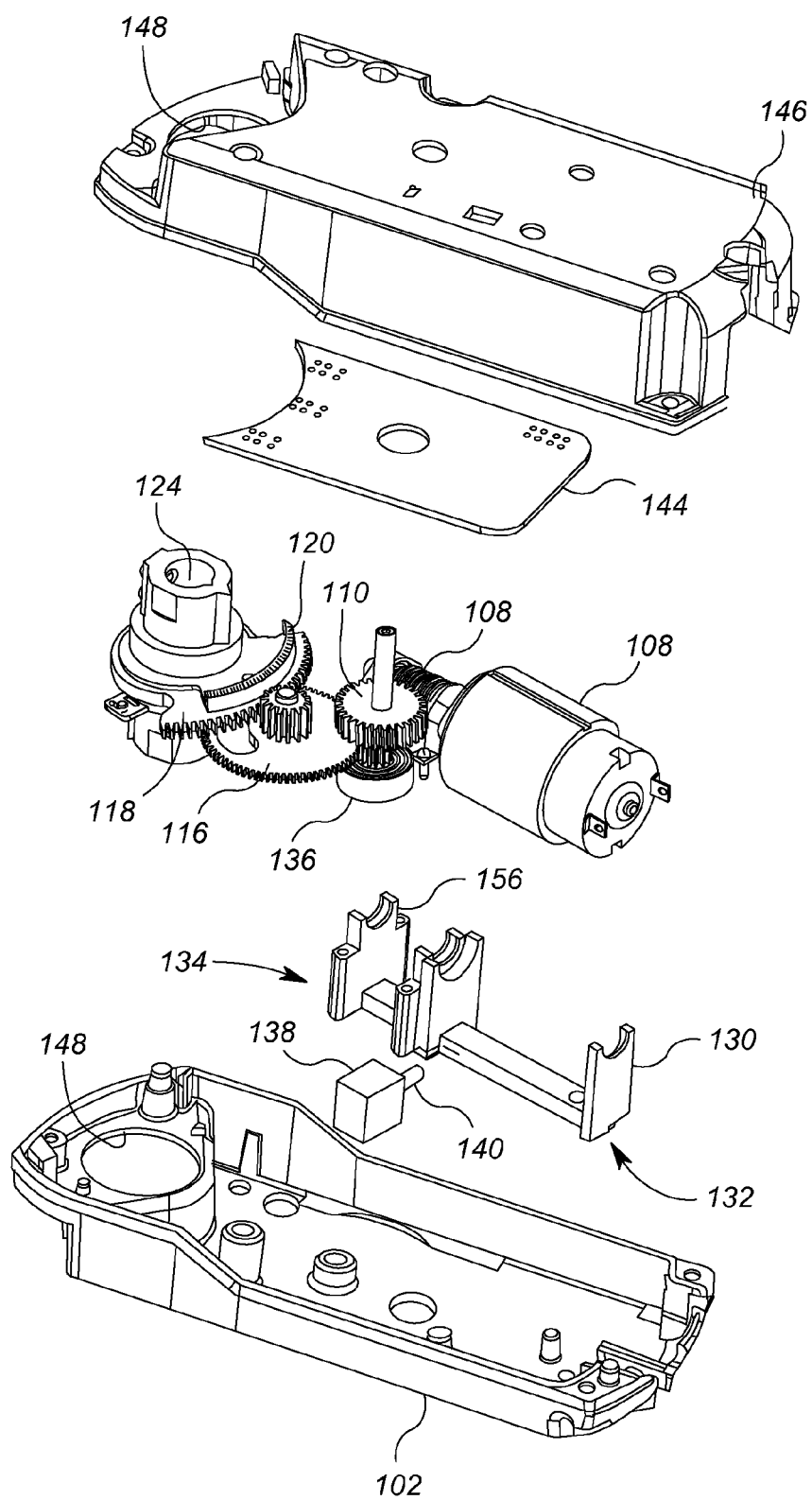
FIG. 2 shows a partially exploded plan view of the actuator of FIG. 1.
Figure 3:
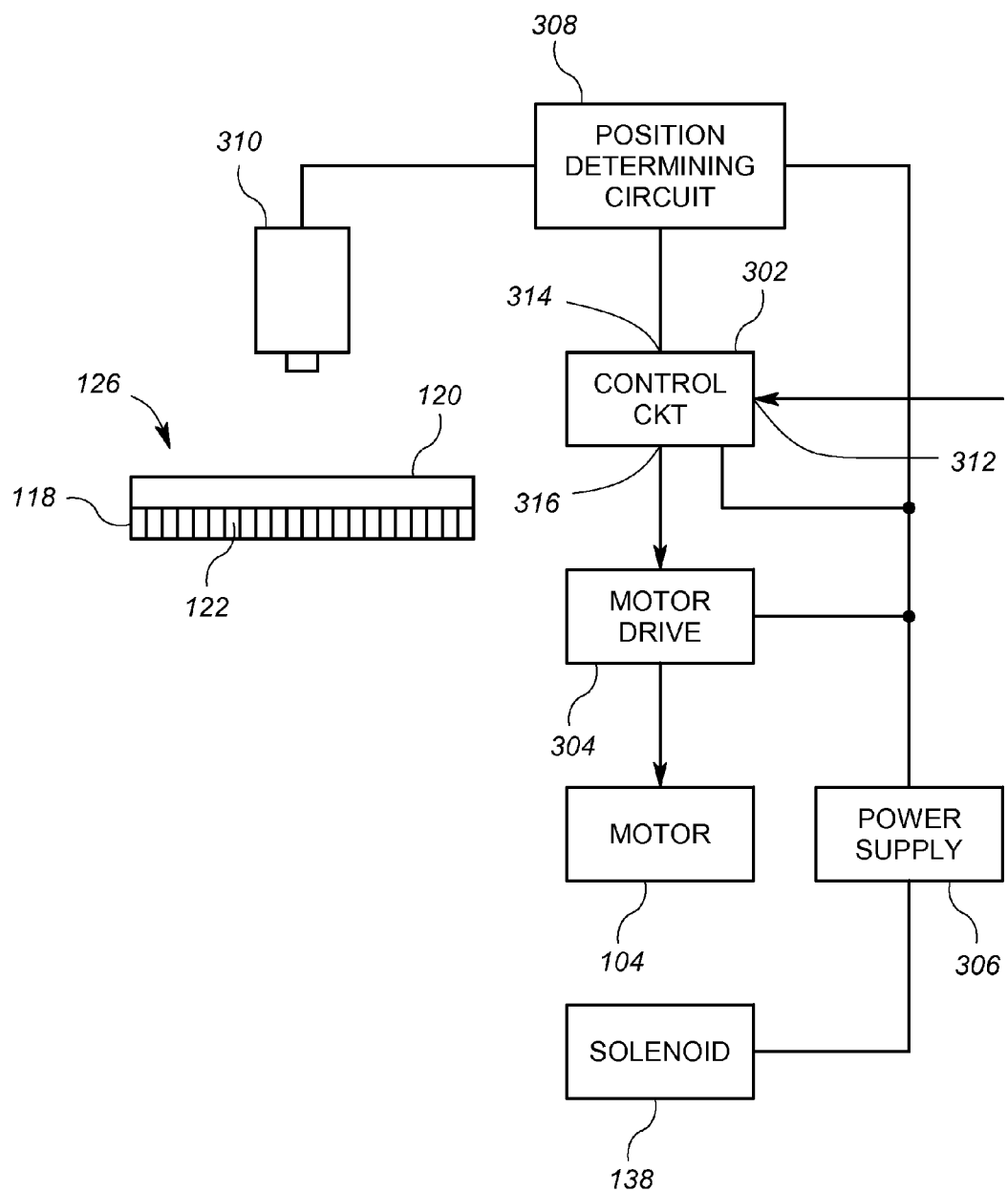
FIG. 3 shows a schematic block diagram of an exemplary configuration of the electrical circuits of the actuator of FIGS. 1 and 2, in context with certain mechanical elements.

FIG. 1 shows a fragmentary plan view of an exemplary embodiment of an actuator in accordance with the present invention. FIG. 2 shows a partially exploded plan view of the actuator of FIG. 1. FIG. 3 shows a schematic diagram of the electrical circuit of the actuator arrangement of FIG. 1. Reference will be made to all three figures contemporaneously.

FIG. 1 in general shows the interior mechanical configuration of an actuator that incorporates principles of at least one embodiment of the invention. Not shown in FIG. 1 is an upper portion the actuator housing 146 and the circuit board 144, which are shown in FIG. 2.

As shown in FIG. 1, the actuator arrangement 100 includes a bottom housing 102, and a motor 104 having an output shaft 106 on which is disposed a worm gear 108. The arrangement 100 also includes a set of intermediate gears 110, 112, 114 and 116 and an output gear 118. Each of the intermediate gears 110, 112, 114 and 116 is a rotary gear, as opposed to a worm gear. In this embodiment, the first intermediate gear 110 and the second intermediate gear 112 are arranged on the same axis, and rotate together. The second intermediate gear 112 is smaller than the first intermediate gear 110, and meshingly engages the third intermediate gear 114. The third intermediate gear 114 and the fourth intermediate gear 116 are arranged on the same axis, and rotate together. The fourth intermediate gear 116 is smaller than the third intermediate gear 114, and meshingly engages the output gear 118.

The output gear 118 is fixedly connected to a curved plate member 120 that extends rotationally and coaxially with respect to teeth 122 on the output gear 118. The output gear 118 is also fixedly connected to an output shaft boss 124. The curved plate member 120 and the output shaft boss 124 are arranged to rotate with the output gear 118 about the same axis.

The curved plate member 120 includes a positional indicia 126 disposed thereon. The position indicia 126 include encoding marks that are detectable by an encoding detector 310 of FIG. 3, which may suitably comprise an optical detector. As will be discussed further below in connection with FIG. 3, the encoding detector 310 is coupled to circuitry 308 (see FIG. 3) that generates position information based on signals received from the encoding detector 128 and provides them to a motor control circuit 302 (see FIG. 3).

The output gear 118 preferably has less than 360 degrees of rotation and thus has outer radial circumferential teeth 122 that extend less than 360 degrees about the axis of the output gear 118. To this end, it is noted that most HVAC-oriented actuators need only travel from 0 degrees to 90 degrees or less, as dampers, louvers and valves typically experience all levels of "openness" between 0 degrees and 90 degrees. Accordingly, the output gear 118 has less than 100 degrees of rotation, for example, 90 degrees, and a corresponding amount of teeth 122.

In the embodiment described herein, means are provided to disengage the worm gear 108 from the output gear 118. The means for disengaging the worm gear 108 may be a part of an arrangement that causes the actuator output gear 118 to return to a predetermined position upon the occurrence of a power failure. To this end, the arrangement 100 further includes a movable mount 130 for the motor 104 and the shaft 106. The movable mount 130 is pivotally connected proximate a first end 132 thereof such that a second end 134 is arcuately movable from a first position to a second position. In a first position, illustrated in FIG. 1, the worm gear 108 engages the first intermediate gear 110, which causes the worm gear 108 to be operably connected to the output gear 118. In the second position, not shown, the worm gear 108 is disengaged from the first intermediate gear 110, which causes the worm gear 108 to be operably disconnected from the output gear 118.

In order to move the movable mount 130, the arrangement includes a solenoid device 138 having a movable piston 140. In the embodiment described herein, the solenoid device 138 is arranged to bias the piston 140 further outward upon the removal of power. The solenoid device 138 conversely pulls or contracts the piston 140 inward when actuated with electrical power. To this end, the piston 140 may be mechanically biased to extend, for example, by an internal spring, not shown, within the solenoid. The piston 140 includes a distal end 142 that is coupled to the motor 104.

In addition, the arrangement 100 includes a helical torsion spring 136 that is configured to rotate the intermediate gears 110, 112, 114 and 116 when the worm gear 108 is disengaged from the first intermediate gear 110. The helical torsion spring 136 is configured to rotate the intermediate gears 110, 112, 114 and 116 such that the output gear 118 advances to a predetermined position. As will be discussed below, this allows the output gear 118 and the device connected to the output shaft boss 124 to rotate to a predetermined position upon the occurrence of a power failure. In this embodiment, the helical torsion spring 136 is arranged about, and configured to rotate directly, the axis on which the intermediate gears 110, 112 are located.

As shown in FIG. 2, the arrangement 100 further includes a printed circuit board 144 which may suitable be mounted on the an housing 146. The printed circuit board 144 includes various electrical elements of the actuator arrangement 100, which are discussed below in connection with FIG. 3. As shown in FIG. 2, an upper housing 146 is configured to cooperate with the lower housing 102 to enclose the elements of the arrangement 100, leaving only a through-hole 148 through which a shaft may pass to be connected at the output shaft boss 124. Thus, when assembled, the only functional element that is exposed is the output shaft boss 124.

Referring to FIG. 1, the actuator arrangement 100 may suitably further include at least one bearing arrangement to provide stabilization and support to the worm gear 108. In this embodiment, the actuator arrangement 100 includes a first bearing arrangement 150 that is disposed proximate the second end 134 of the motor mount 130, and a second bearing arrangement 152 disposed about the shaft 106 proximate to the motor 104.

Figure 5:
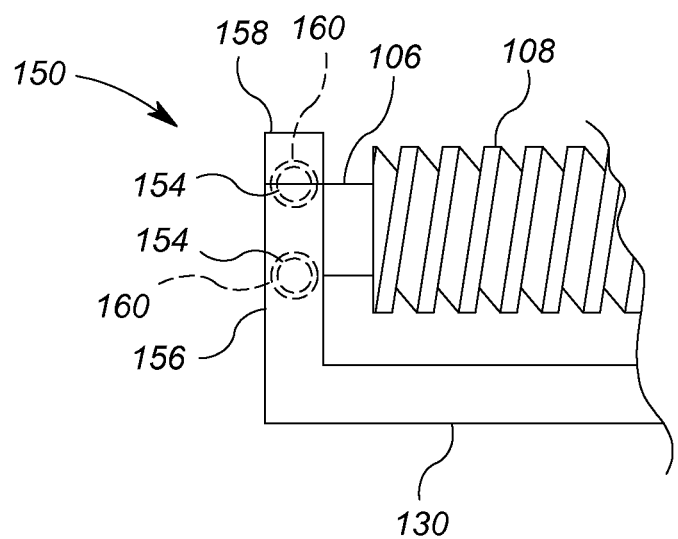
FIG. 5 shows a side plan view of one of the bearing arrangements and a fragmentary portion of the shaft of the actuator arrangement of FIG. 1.

FIG. 5 shows a side plan view of the first bearing arrangement 150 and fragmentary portions of the shaft 106 and motor mount 130. The first bearing arrangement includes ball bearings 154 (shown in phantom), and a bearing housing. In this embodiment, the bearing housing includes a lower bearing housing 156 that forms part of the structure that forms the motor mount 130, and an upper bearing housing 158 that is affixed (via fastener or otherwise) to the motor mount 130 adjacent to the lower bearing housing 156. The lower bearing housing 156 is also shown in FIG. 2.

As shown in FIG. 5 in phantom, the upper and lower bearing housings 158, 156 cooperate to form a circular trace 160 for retaining the ball bearings 154 in a manner known in the art. The bearing arrangement 152 may suitably have a substantially identical structure. The lower bearing housing 156' and upper bearing housing 158' of the bearing arrangement 152 are shown at least partly in FIG. 1. The bearing arrangements 150 and 152 provide support to the shaft 106 to handle the significant force of moving and stopping the device connected to the output shaft boss 124.

Referring now to the circuitry, FIG. 3 shows a schematic block diagram of the electrical elements of the actuator arrangement 100 of FIGS. 1 and 2. For purposes of context, FIG. 3 also shows the output gear 118 and arcuate plate 120 apart from the other mechanical elements of FIGS. 1 and 2.

As shown in FIG. 3, the electric portion of the actuator arrangement 100 includes a control circuit 302, a motor drive 304, the motor 104, the solenoid 138, a power supply 306, a position determining circuit 308, and an encoding detector 310. The control circuit 302, the motor drive 304, the power supply 306, the positioning determining circuit 308 and encoding detector 310 may suitably be disposed on the printed circuit board 144 shown in FIG. 2.

The control circuit 304 is a circuit that generally controls the operation of the motor 104 in order to adjust the rotationally position of the output gear 118 of the actuator 100. To this end, the control circuit 302 includes an input 312 that receives a position signal, typically from an external device. In particular, the position signal includes information identifying a set point position to which the output of the actuator is to be moved. The control circuit 302 further includes an input 314 operably connected to receive a position feedback signal from the position determining circuit 308. The control circuit 302 also includes an output 316 to which is provided a control output signal. As will be discussed below, the control output signal is used to control the operation of the motor 104. The control output signal may suitably include information sufficient to identify a speed and direction of rotation of the motor.

To this end, the output 316 of the control circuit 302 is connected to the motor drive 304. The motor drive circuit 304 is a circuit that converts the control output signal to power signals that controllably actuate the motor 104. Such circuits are known and may take various forms.

The encoding detector 310 is a device that detects the positional indicia 126 on the arcuate member 120, and generates a signal representative thereof. The position determining circuit 308 is a circuit that is operably connected to the encoding detector 310, and is further configured to generate a feedback signal representative of the position of the output gear 118, based on the signal received from the encoding detector 310. The position determining circuit 308 is further configured to provide the feedback signal to the feedback signal input 314 of the control circuit 302.

Figure 4:
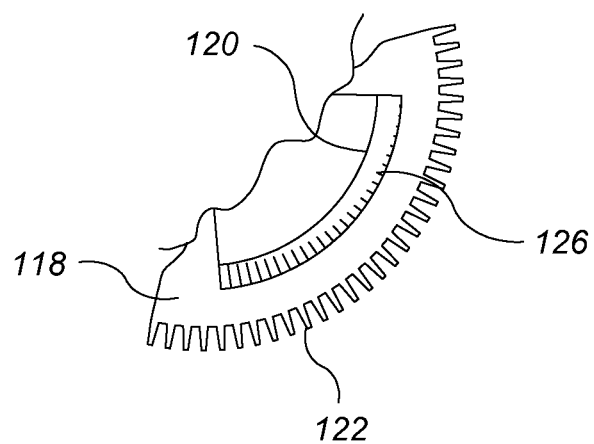
FIG. 4 shows a fragmentary view of an exemplary indicia arrangement on the output gear of FIG. 1.

In further detail, the encoding detector 310 and the arcuate member 120 are arranged such that for each of the output positions of the output gear 118, a unique composite image of the indicia 126 is detected by the encoding detector 310. This unique composite image of the indicia 126 causes the encoding detector 310 to provide a unique signal indicative of each output position of the output gear 118. FIG. 4, for example, shows a fragmentary view of the output gear 118 with the position indicia 126 disposed on top of the arcuate member 120. In this example, as shown in FIG. 4, the indicia 126 is disposed on a surface facing axially, as opposed to the teeth 122 that face radially outward. The indicia 126 are shown has a set of equidistant parallel lines increasing in height as a function of rotational position.

It will be appreciated that in an alternative embodiment, the indicia 126 be configured such that each output position does not result in the detection of a unique composite image. Instead, the indicia 126 may at least partly provide only images indicating incremental position changes, similar to the intermediate lines of a ruler or tape measure. In such a case, the encoding detector 310 provides signals indicating movement or progress of the output position, which may be referenced by other circuitry to a starting point or other reference point.

Referring again to FIG. 3 in particular, the power supply 306 may suitably be one or more linear voltage regulators, other power supply circuits, or combinations thereof. The power supply 306 is operably connected to provide bias power to the position determining circuit 308, the control circuit 302, the motor drive 306 and the solenoid 138. The power supply 306 in this embodiment is connected to an external power source. However, the power supply 306 in some embodiments may include a battery.

The operation of the actuator arrangement 100 of FIGS. 1, 2 and 3 is now provided with reference to all three figures. In a first exemplary operation, it will be assumed the arrangement is used in conjunction with a sash of a fume hood or a ventilation damper. Accordingly, a rotating shaft or linkage, not shown, is affixed to the output shaft boss 124. The rotating shaft or linkage, as is typical in the art, is configured to rotate to cause a damper or sash to be at different levels of openness. As evidenced by the output gear 118, the position of the output shaft boss 124 (and hence any device actuated thereby) can vary by approximately 90 degrees rotationally. Accordingly, the output position is referenced in the range of 0 degrees to 90 degrees.

In this operation, it will be assumed that the starting (current) output position is 30 degrees, and that a position signal is received that indicates that the output position is to be changed to 0 degrees. At 0 degrees, it can be assumed that the fume hood sash or ventilation damper is fully closed.

During normal operation, the power supply 306 provides bias power to the control circuit 302, the drive circuit 304, the position determining circuit 308, and the solenoid 138. The bias power is required for the control circuit 302, the drive circuit 304 and the position determining circuit 308 to operate as discussed below. The bias power also causes the solenoid 138 to retract the piston 140, which rotates the motor mount 130 such that the worm gear 108 is drawn into meshing engagement with the first gear 110. These conditions describe the normal operating state of the actuator arrangement 100, when electrical power is available to the power supply 306.

Referring again to the exemplary operation, the input 312 first receives the position signal indicating that the output position should be changed to 0 degrees. The specific format of the signal and/or the format of position information may be anything suitable. The control circuit 302 then generates an output signal at the output 316 that causes the drive circuit 304 to energize the motor 104 in a controlled way such that the motor rotates. In accordance with the embodiment described herein, the motor 104 may be controllably rotated in either direction, based on energy provided by the drive circuit 304. The control circuit 302 (via the drive circuit 304) suitably rotates the motor 104 in a direction that is dependent on whether new output position is more closed (close to 0 degrees) or more open (closer to 90 degrees) than the current output position. Accordingly, in the example discussed herein, the control circuit 302 provides signals to the drive circuit 304 that cause the drive circuit 304 to drive the motor 104 in a direction that corresponds to reducing the degrees of the output position.

As the motor 104 rotates, the shaft 106 rotates the worm gear 108, and the rotating worm 108 gear drives the first gear 110. Because the first gear 110 and second gear 112 are fixedly connected to the same shaft, the second gear 112 also rotates. The second gear 112, which is meshingly engaged to the third gear 114, drives the third gear 114, thereby causing the fourth gear 116 to also rotate. The fourth gear 116, which is meshingly engaged to the output gear 118, drives the output gear 118. Because of the relative radial sizes of the gears 110, 112, 114, 116 and 118, a significant reduction in rotation speed occurs between the worm gear 108 and the output gear 118. The significant reduction allows for better control of the output position in relation to motor speed.

As the output gear 118 and output shaft boss 124 rotate, they drive the shaft of the controlled equipment, not shown, such as a sash of a fume hood or a ventilation damper. While the output shaft boss 124 and output gear 118, the arcuate plate 120 moves the indicia 126 past the line of sight of the encoding detector 310. The encoding detector 310 performs an image detection operation to formulate a signal indicative of the passing indicia 126. As discussed above, the position indicia 126 is configured such that each output position exposes a unique image to the encoding detector 310. For example, the position indicia 126 may suitably include a series of parallel lines with increasing size. (See FIG. 4). The encoding detector 310 in such a case provides a signal that is representative of the relative size of the line or lines in the detected image. The encoding detector 310 provides this signal to the position determining circuit 308.

The position determining circuit 308 receives the signal from the encoding detector 310 and generates a feedback signal representative of the output position. For example, before the initial rotation from the starting 30 degree position, the position determining circuit 308 may suitably generate a feedback signal indicating the output position as 30 degrees. The position determining circuit 308 provides the feedback signal to the feedback input 314 of the control circuit 302.

The control circuit 302 then generates a control output at the output 316 based on the feedback signal and the position signal received at the input 312. The control output signal may suitably be three state signal indicating clockwise-on, counterclockwise-on, or off. The control output signal may alternatively be a scalar value indicative of speed and direction. In any event, to generate the control signal, the control circuit 302 generally compares the position signal (i.e. set point) received at the input 312 with the position feedback signal received at the input 314, and determines an error signal as the difference therebetween. The control circuit 302 then determines how the motor should operate to reduce the error signal. For example, if the set point is 0 degrees, and the feedback signal identifies the current position as 30 degrees, then the control circuit 302 generates a signal that causes the motor 108 to rotate the output shaft 118 to a more closed (lower degree) position.

The control circuit 302 is preferably optimized or at least made to be efficiently cause the motor 108 to change the output position as quickly as possible without risk of significant or potentially damaging error. Various control algorithms, such as PI, or PID algorithms, may be used to generate the control signals based on the error signal. As discussed above, the control output from the control circuit 302 is provided to the motor drive 304, which in turn provides the voltages and power required to energize the motor 104 accordingly.

As the error signal approaches zero, the control circuit 302 preferably generates a signal that causes the motor 104 to stop. In this embodiment, significant advantages result from the combined use of the indicia 126 and the worm gear 108 allows for a tightly controlled stop. In particular, the direct positional feedback of the indicia 126 provides immediate and accurate position information as measured within the actuator housing itself. The immediate and accurate position information does not suffer from propagation delays and/or inaccuracies caused by indirect or external position feedback.

Moreover, the use of the worm gear 108 allows for a stable and controlled mechanical stop that is not possible from a gear train composed purely of rotary gears. In particular, with rotary gears in prior art devices, momentum of the moved mechanical device can cause the gear train within the actuator to continue to rotate slightly after the moment when the motor is turned off, thus potentially causing the output position to be incorrect. With the worm gear of FIGS. 1 and 2, continuing rotation force cannot easily be propagated from the gear 110 to the worm gear 108, as it is not generally possible to drive a worm gear from a rotational gear.

The above described embodiments allow for increased speed in the change of output position without sacrificing accuracy.

An additional advantage of this embodiment is the return-to-zero failure mode of operation, which is described below.

In some applications, it is necessary for the controlled device (i.e. any shaft connected to the output shaft boss 124) to return to a predetermined position in the event of a power failure. For example, it may be required that a fume hood sash return to a closed position (i.e. the zero position) upon power failure, as a failsafe way to contain any dangerous fumes or gasses within the hood.

Upon power failure in the actuator arrangement of FIGS. 1, 2 and 3, the power supply 306 stops providing power to the circuits 302, 304, 308 and the solenoid 138. As a consequence, the motor 104 can no longer be operated by the control circuit 302 and motor drive 304. Moreover, when power is removed from the solenoid 138, the spring loaded piston 140 extends, thereby moving the motor mount 130 such the worm gear 108 is disengaged from the first gear 110. Prior to disengagement, the worm gear 108 holds the first gear 110 in place, thereby also holding the gears 112, 114, 116 and 118 in place upon power failure. However, after disengagement via extension of the solenoid piston 140, the gears 112, 114, 116 and 118 may rotate independent of the worm gear 108. In such a configuration, the helical torsion spring 136 starts to rotate the gears 112, 114, 116 and 118 such that the output gear 118 advances toward the zero position (or some other predetermined position).

Accordingly, if electrical power is unavailable, the solenoid 138 operates to disengage the worm gear 108 from the output gear 118, and the helical torsion spring 136 is free to move the output gear 118. Conversely, when power is available, the solenoid 138 operates to engage the worm gear 108 to the output gear 118 and the helical torsion spring 136 cannot move the output gear 118 because it cannot drive the worm gear 108 via the first gear 110.

It will be appreciated that the helical torsion spring may suitably be coupled to the axis that is shared by the third and fourth gears 114 and 116, instead of the axis that is shared by the first and second gears 110 and 112 as shown. It will also be generally appreciated that the intermediate gear set between the worm gear and the output gear may take a variety of forms. However, the particular form shown in FIGS. 1 and 2 achieves good rotational speed reduction within a small space.

In another alternative, it may be advantageous for the position output of the actuator arrangement 100 to fail in place, instead of returning to a predetermined position. In such an arrangement, the solenoid 138 and the helical torsion spring 136 are not necessary. Moreover, the motor mount 130 need not be movable with respect to the housing 102. In such an arrangement, the motor mount 130 is arranged such that the worm gear 108 is fixedly engaged to the first gear 110. Thus, upon the occurrence of a power failure, the worm gear 108 stays engaged to the first gear 110, thereby preventing movement of the output gear 118. As such, this alternative arrangement "fails in place" because upon removal of electrical power, the output gear 118 stays in its current position.

It will be appreciated that the above described embodiments are merely illustrative, and that those of ordinary skill in the art may readily devise their own modifications and implementations that incorporate the principles of the present invention and fall within the spirit and scope thereof.

We claim:

1. An actuator arrangement a rotational output, comprising:

a housing defining an interior space;

a motor supported within the interior space of the housing and having an output shaft, the output shaft including a worm gear;

at least one intermediate gear supported within the interior space of the housing and configured to be driven to rotate by the worm gear;

an output gear supported within the interior space of the housing for rotation about an axis and meshingly engaged with the at least one intermediate gear such that the output gear is driven to rotate about the axis by the at least one intermediate gear when the at least one intermediate gear is driven to rotate by the worm gear;

an output shaft boss fixedly connected to the output gear for rotation therewith about the axis and configured to generate a rotational output at the axis when the output gear is driven to rotate by the at least one intermediate gear, the housing including an output opening via which the output shaft boss is accessed from an exterior of the housing;

position encoding indicia fixedly arranged on the output gear, the position encoding indicia being optically detectable and configured to indicate an angular position of the output gear in relation to the axis; and an optical encoding detector disposed in the interior space of the housing and configured to optically detect the position encoding indicia.

2. The actuator arrangement of claim 1, wherein the output shaft includes a first end portion proximate the motor and an opposite second end portion; and further comprising a bearing arrangement contacting the second end portion.

3. The actuator arrangement of claim 2, wherein the bearing arrangement includes a ball bearing and a bearing housing.

4. An actuator arrangement a rotational output, comprising:

a housing defining an interior space;

a motor supported within the interior space of the housing and having an output shaft, the output shaft including a worm gear;

at least one intermediate gear supported within the interior space of the housing and configured to be driven to rotate by the worm gear;

an output gear supported within the interior space of the housing for rotation about an axis and meshingly engaged with the at least one intermediate gear such that the output gear is driven to rotate about the axis by the at least one intermediate gear when the at least one intermediate gear is driven to rotate by the worm gear;

an output shaft boss fixedly connected to the output gear for rotation therewith about the axis and configured to generate a rotational output at the axis when the output gear is driven to rotate by the at least one intermediate gear, the housing including an output opening via which the output shaft boss is accessed from an exterior of the housing;

position encoding indicia fixedly arranged on the output gear, the position encoding indicia being optically detectable and configured to indicate an angular position of the output gear in relation to the axis;

an optical encoding detector disposed in the interior space of the housing and configured to optically detect the position encoding indicia; and a control circuit having a position input, and a feedback input coupled to the encoding detector, the control circuit configured to drive the motor based on a position signal received at the position input and a feedback signal received at the encoding detector, wherein the control circuit and the encoding detector are disposed on a circuit board that is supported within the housing.

5. The actuator arrangement of claim 4, wherein the output shaft includes a first end portion proximate the motor and an opposite second end portion; and further comprising a bearing arrangement contacting the second end portion.

6. The actuator arrangement of claim 5, wherein the bearing arrangement includes a ball bearing and a bearing housing.

7. The actuator arrangement of claim 4, wherein the at least one intermediate gear includes first and second gears affixed to a first shaft, the first gear meshly engaged to the worm gear, the second gear meshingly engaged with the output gear.

8. The actuator arrangement of claim 7, wherein the second gear is coupled to a third gear affixed to a second shaft, and further comprising a fourth gear affixed to the second shaft, the fourth gear meshingly engaging the output shaft.

9. The actuator arrangement of claim 4, wherein the output gear includes teeth meshingly engaged with the at least one intermediate gear; and wherein the teeth extend circumferentially around the output gear less than 100 degrees.

10. The actuator arrangement of claim 9, wherein the positional indicia are affixed to a curved plate member that is fixedly connected to the output gear and arranged generally coaxially with respect to the teeth.

* * * * *